US012316416B2

(12) United States Patent
Nam et al.

(10) Patent No.: US 12,316,416 B2
(45) Date of Patent: May 27, 2025

(54) REFERENCE SIGNAL RESOURCE INDICATION (71) Applicant: QUALCOMM Incorporated, San Diego, CA (US)

(72) Inventors: Wooseok Nam, San Diego, CA (US); Tao Luo, San Diego, CA (US)

(*) Notice: Subject to any disclaimer, the term of this patent is extended or adjusted under 35 U.S.C. 154(b) by 0 days.

(21) Appl. No.: 18/338,559

(22) Filed: Jun. 21, 2023

(65) Prior Publication Data

US 2023/0412228 A1 Dec. 21, 2023

Related U.S. Application Data

(63) Continuation of application No. 17/248,076, filed on Jan. 7, 2021, now Pat. No. 11,722,194.

(60) Provisional application No. 62/959,591, filed on Jan. 10, 2020.

(51) Int. Cl.
*H04W 4/00* (2018.01)
*H04B 7/06* (2006.01)
*H04L 5/00* (2006.01)
*H04W 68/00* (2009.01)
*H04W 72/23* (2023.01)
*H04W 76/11* (2018.01)
*H04W 76/27* (2018.01)
*H04W 76/30* (2018.01)

(52) U.S. Cl.
CPC ......... *H04B 7/0626* (2013.01); *H04L 5/0051* (2013.01); *H04W 68/005* (2013.01); *H04W 72/23* (2023.01); *H04W 76/11* (2018.02); *H04W 76/27* (2018.02); *H04W 76/30* (2018.02)

(58) Field of Classification Search
None
See application file for complete search history.

(56) References Cited

U.S. PATENT DOCUMENTS

| 10,779,259 B2 | 9/2020 | Islam |
| 11,722,194 B2 | 8/2023 | Nam et al. |
| 2011/0105144 A1 | 5/2011 | Siomina et al. |
| 2012/0213108 A1 | 8/2012 | Ji et al. |
| 2016/0050053 A1 | 2/2016 | Wong et al. |
| 2018/0063835 A1 | 3/2018 | Abedini et al. |

(Continued)

FOREIGN PATENT DOCUMENTS

| CN | 110072285 A | 7/2019 |
| EP | 3739939 A1 | 11/2020 |

(Continued)

OTHER PUBLICATIONS

International Preliminary Report on Patentability—PCT/US2021/070016 The International Bureau of WIPO—Geneva, Switzerland, Jul. 21, 2022.

(Continued)

*Primary Examiner* — Zewdu A Beyen (57) ABSTRACT

Various aspects of the present disclosure generally relate to wireless communication. In some aspects, a base station (BS) may determine, for a user equipment (UE) in an idle mode or an inactive mode, a reference signal configuration, wherein the reference signal configuration is for a channel state information reference signal or a tracking reference signal; and transmit, to the UE, a message including information identifying the reference signal configuration. Numerous other aspects are provided.

30 Claims, 7 Drawing Sheets

(56) References Cited

U.S. PATENT DOCUMENTS

| | | |
|---|---|---|
| 2019/0045481 A1 | 2/2019 | Sang et al. |
| 2019/0215117 A1 | 7/2019 | Lee et al. |
| 2020/0137602 A1 | 4/2020 | Zhang et al. |
| 2020/0313818 A1 | 10/2020 | Wu |
| 2021/0028843 A1* | 1/2021 | Zhou .................. H04B 7/063 |

FOREIGN PATENT DOCUMENTS

| | | |
|---|---|---|
| WO | 2018186995 | 10/2018 |
| WO | WO-2019137424 A1 | 7/2019 |

OTHER PUBLICATIONS

International Search Report and Written Opinion—PCT/US2021/070016—ISA/EPO—Apr. 15, 2021.

Qualcomm Incorporated: "Remaining Issues on TRS", 3GPP Draft, 3GPP TSG RAN WG1 #91, R1-1720671_TRS Open Issues, 3RDGeneration Partnership Project (3GPP), Mobile Competence Centre, 650, Route DesLucioles, F-06921 Sophia-Antipolis Cedex, France, vol. RAN WG1, No. Reno, NV, USA, Nov. 27, 2017-Dec. 1, 2017, Nov. 18, 2017, XP051370132, pp. 1-6, the Whole Document, Parts 2-3 and 5.

* cited by examiner

REFERENCE SIGNAL RESOURCE INDICATION

CROSS-REFERENCE TO RELATED APPLICATION

This application is a continuation of U.S. Non-Provisional application Ser. No. 17/248,076, entitled "REFERENCE SIGNAL RESOURCE INDICATION" filed Jan. 7, 2021, which claims priority U.S. Provisional Patent Application No. 62/959,591, entitled "REFERENCE SIGNAL RESOURCE INDICATION," filed on Jan. 10, 2020, which is hereby incorporated by reference in its entirety as if fully set forth below for all applicable purposes.

FIELD OF THE DISCLOSURE

Aspects of the present disclosure generally relate to wireless communication and to techniques and apparatuses for reference signal resource indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a base station (BS), may include determining, for a user equipment (UE) in an idle mode or an inactive mode, a reference signal configuration, wherein the reference signal configuration is for a channel state information reference signal or a tracking reference signal; and transmitting, to the UE, a message including information identifying the reference signal configuration.

In some aspects, a method of wireless communication, performed by a UE, may include receiving a message including information identifying a reference signal configuration for an idle mode or an inactive mode of the UE, wherein the reference signal configuration is for a channel state information reference signal or a tracking reference signal; and determining the reference signal configuration based at least in part on the message.

In some aspects, a B S for wireless communication may include memory and one or more processors operatively coupled to the memory. The memory and the one or more processors may be configured to determine, for a UE in an idle mode or an inactive mode, a reference signal configuration, wherein the reference signal configuration is for a channel state information reference signal or a tracking reference signal; and transmit, to the UE, a message including information identifying the reference signal configuration.

In some aspects, a UE for wireless communication may include memory and one or more processors operatively coupled to the memory. The memory and the one or more processors may be configured to receive a message including information identifying a reference signal configuration for an idle mode or an inactive mode of the UE, wherein the reference signal configuration is for a channel state information reference signal or a tracking reference signal; and determine the reference signal configuration based at least in part on the message.

In some aspects, a non-transitory computer-readable medium may store one or more instructions for wireless communication. The one or more instructions, when executed by one or more processors of a BS, may cause the one or more processors to determine, for a UE in an idle mode or an inactive mode, a reference signal configuration, wherein the reference signal configuration is for a channel state information reference signal or a tracking reference signal; and transmit, to the UE, a message including information identifying the reference signal configuration.

In some aspects, a non-transitory computer-readable medium may store one or more instructions for wireless communication. The one or more instructions, when executed by one or more processors of a UE, may cause the one or more processors to receive a message including information identifying a reference signal configuration for an idle mode or an inactive mode of the UE, wherein the reference signal configuration is for a channel state information reference signal or a tracking reference signal; and determine the reference signal configuration based at least in part on the message.

In some aspects, an apparatus for wireless communication may include means for determining, for a UE in an idle mode or an inactive mode, a reference signal configuration, wherein the reference signal configuration is for a channel state information reference signal or a tracking reference signal; and means for transmitting, to the UE, a message including information identifying the reference signal configuration.

In some aspects, an apparatus for wireless communication may include means for receiving a message including information identifying a reference signal configuration for an idle mode or an inactive mode of the apparatus, wherein the reference signal configuration is for a channel state information reference signal or a tracking reference signal; and means for determining the reference signal configuration based at least in part on the message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
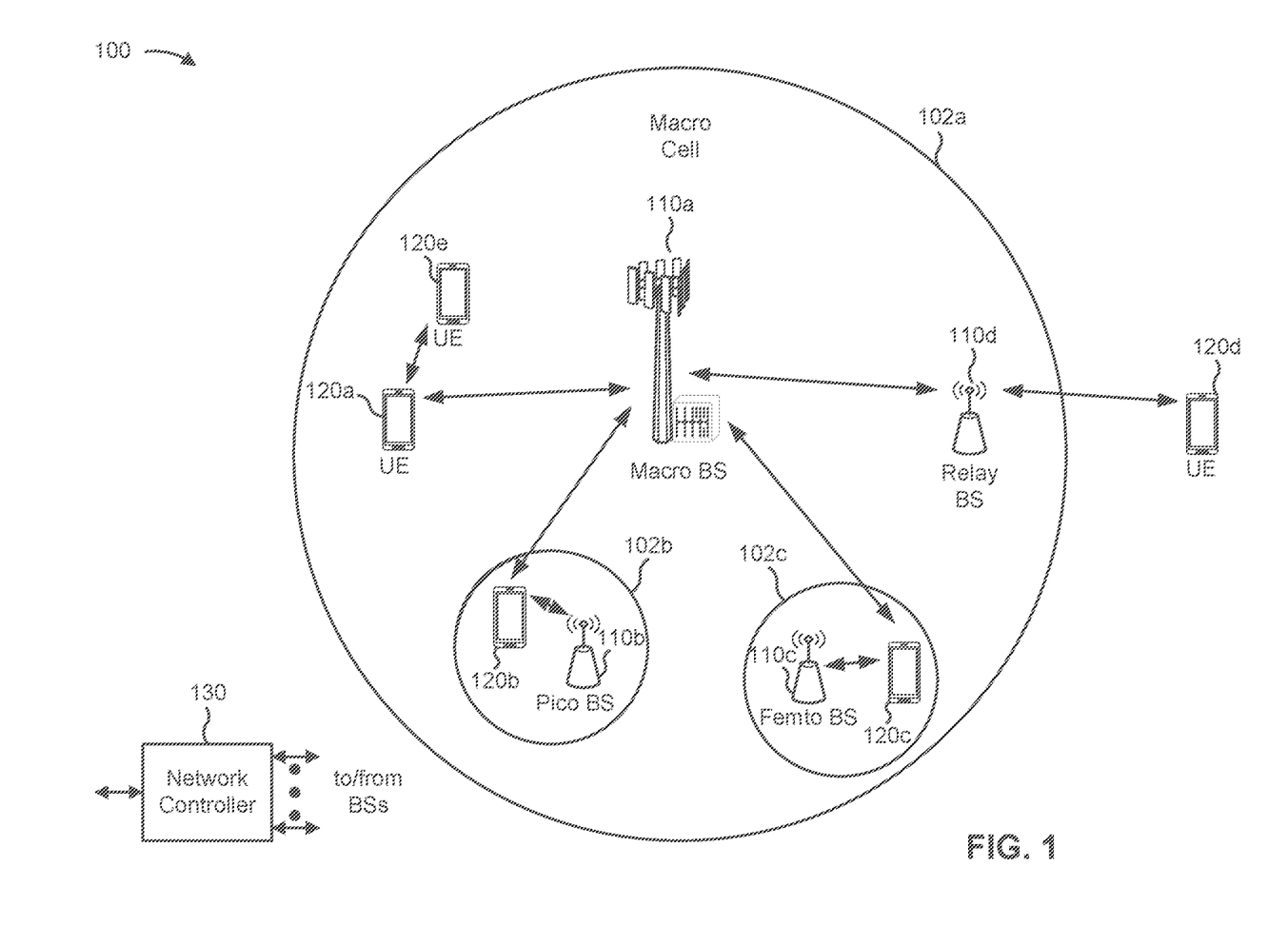
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol, among other examples), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
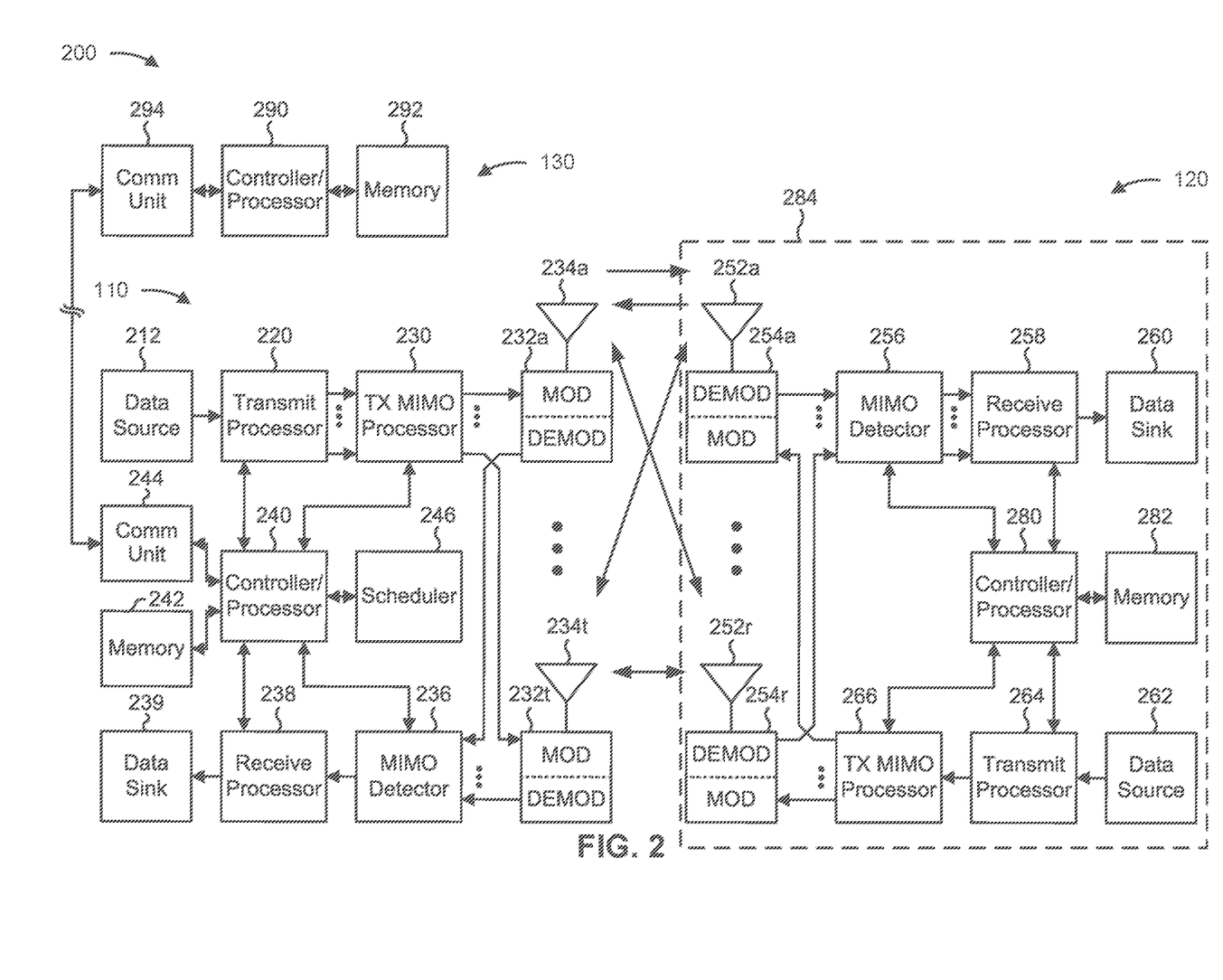
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal resource indication, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a message including information identifying a reference signal configuration for an idle mode or an inactive mode of the UE, wherein the reference signal configuration is for a channel state information reference signal or a tracking reference signal, means for determining the reference signal configuration based at least in part on the message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining, for a UE in an idle mode or an inactive mode, a reference signal configuration, wherein the reference signal configuration is for a channel state information reference signal or a tracking reference signal, means for transmitting, to the UE, a message including information identifying the reference signal configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a UE may transfer from a connected mode, in which the UE uses a regular level of power, to an idle mode or an inactive mode, in which the UE uses a reduced level of power. This may enable increased battery life for the UE. In an idle mode or inactive mode, the UE may deactivate one or more functionalities to reduce power consumption, such as by monitoring to receive signaling during only a subset of symbols or slots. The BS and the UE may coordinate to ensure that the BS transmits information during the subset of symbols or slots during which the UE is configured to receive the information. For example, the UE may periodically monitor a paging channel to attempt to receive a paging message from the BS and the BS may transmit the paging message during a paging occasion when the UE is scheduled to monitor the paging channel.

In some cases, the BS may transmit a physical downlink control channel (PDCCH) with downlink control information (DCI) to indicate a corresponding physical downlink shared channel (PDSCH) on which a paging message is to be conveyed. To facilitate receipt of the paging message, the BS may transmit reference signals and information for channel tracking, cell search, cell reselection, and/or the like. In LTE, a cell-specific reference signal (CRS) may be used by UEs in the idle mode. However, in NR, only a synchronization signal (SS) or physical broadcast channel (PBCH) block is available for UEs in the idle mode or inactive mode. In some case, a synchronization signal block (SSB) density (e.g., a frequency with which SSBs are transmitted by the BS) may be less than a threshold, which may result in a paging occasion being relatively far from a closest SSB. As a result, a length of time that the UE remains on between the closest SSB and a related paging occasion may be relatively long, which may result in an excessive use of power resources.

To reduce this delay between receipt of an SSB and a corresponding paging occasion, the BS may use additional reference signals, such as tracking reference signal (TRS) or channel state information reference signal (CSI-RS) resources, which are allocated for connected mode UEs, to provide signaling for idle mode or inactive mode UEs. To configure TRS resources or CSI-RS resources for a connected mode UE, the BS may transmit higher-layer signaling (e.g., radio resource control (RRC) signaling) to the connected mode UE to indicate a reference signal configuration. The reference signal configuration may include information identifying time resources, frequency resources, a scrambling sequence, quasi-co-location (QCL) information, and/or the like. However, for idle mode or inactive mode UEs, such signaling may not be specified.

Some aspects described herein enable a BS to indicate a reference signal configuration to an idle mode or inactive mode UE. For example, the BS may determine the reference signal configuration for a UE, which is in an idle mode or an inactive mode, and may provide information identifying the reference signal configuration via a system information message, a short message, a paging message, an RRC release message, and/or the like. In this case, the UE may receive the information identifying the reference signal configuration from the BS, determine the reference signal configuration based at least in part on the information, and use the reference signal configuration in a subsequent communication with the BS (e.g., for transmission of a reference signal using CSI-RS resources or TRS resources). In this way, the BS and the UE enable the UE, when operating in an idle mode or an inactive mode, to use CSI-RS resources or TRS resources that are allocated for connected mode UEs, thereby improving paging for idle mode or inactive mode UEs.

Figure 3:
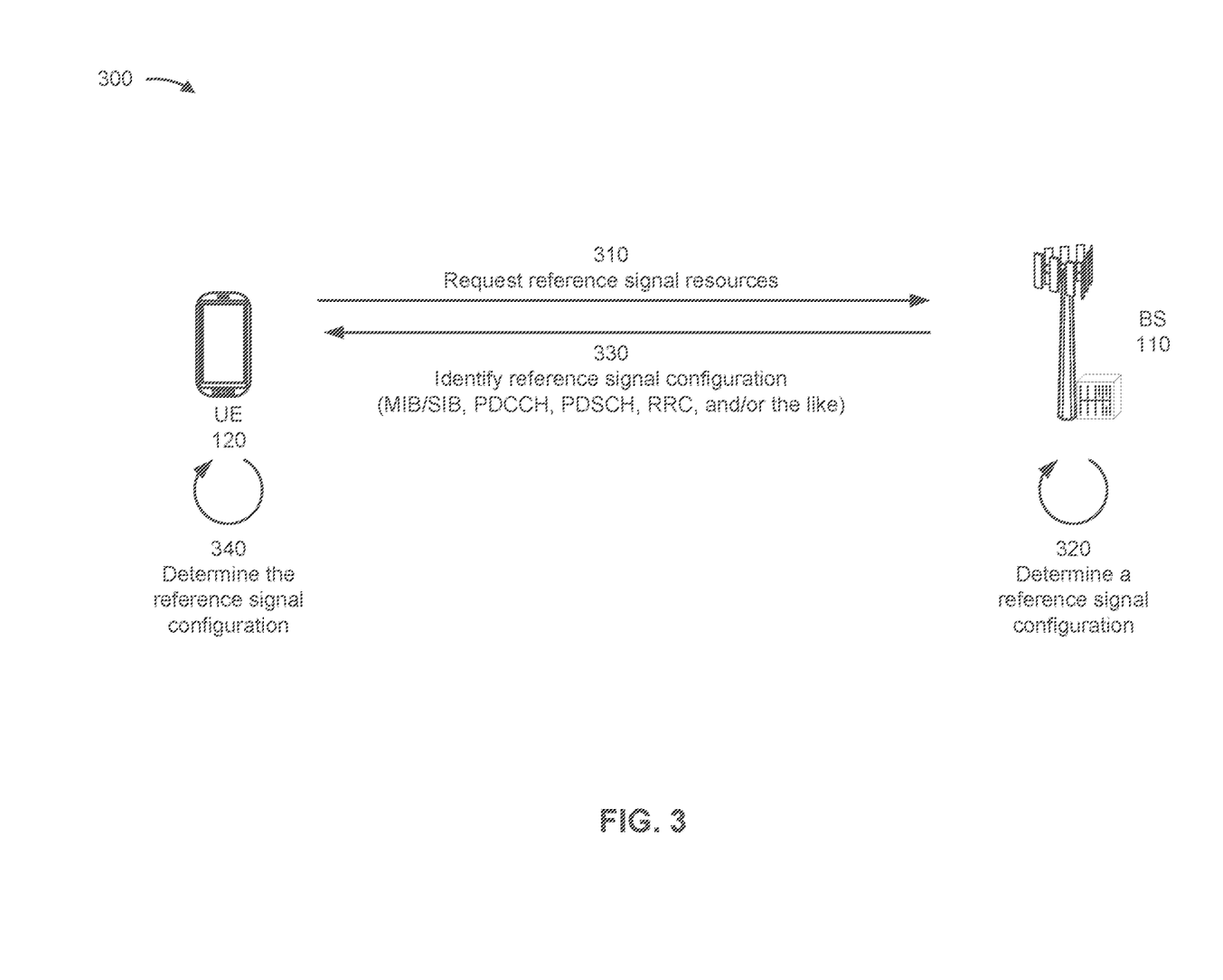
FIG. 3 is a diagram illustrating an example of reference signal resource indication, in accordance with various aspects of the present disclosure.

FIG. 3 is a diagram illustrating an example 300 of reference signal resource configuration, in accordance with various aspects of the present disclosure.

As shown in FIG. 3, and by reference number 310, UE 120 may request reference signal resources. For example, UE 120 may request CSI-RS resources, TRS resources, and/or the like to enable channel estimation, cell selection, and/or the like for receiving subsequent paging in an idle mode or inactive mode. In some aspects, UE 120 may request the reference signal resources when operating in an idle mode or an inactive mode using random access channel signaling or another type of signaling.

As shown in FIG. 3, and by reference number 320, BS 110 may determine a reference signal resource configuration for the reference signal resources. For example, BS 110 may receive the request from UE 120 and may determine reference signal resources for use by UE 120. In some aspects, when CSI-RS resources or TRS resources are available, BS 110 may identify the existing CSI-RS resources or TRS resources for use by UE 120. For example, BS 110 may determine that TRS resources are allocated for use by connected mode UEs and may indicate to UE 120 that UE 120 may use the TRS resources when in an idle mode or inactive mode. Additionally, or alternatively, BS 110 may allocate new CSI-RS resources or TRS resources.

As shown in FIG. 3, and by reference number 330, BS 110 may transmit information identifying a reference signal configuration. For example, BS 110 may transmit system information via a system information block (SIB) or a master information block (MIB) to identify the reference signal configuration. In this case, BS 110 may include the information identifying the reference signal configuration in a reserved field of the system information or in a dedicated field that is assigned for conveying the reference signal configuration.

In some aspects, BS 110 may transmit the information identifying the reference signal configuration via a short message. For example, BS 110 may transmit a physical downlink control channel (PDCCH) with a cyclic redundancy check (CRC) scrambled using a paging radio network temporary identifier (P-RNTI) of UE 120. In some aspects, BS 110 may use a short message (e.g., the PDCCH) to convey less than a threshold payload. For example, when there is less than a threshold quantity of bits in the information that identifies the reference signal configuration, BS 110 may include the information that identifies the reference signal configuration in the PDCCH. Additionally, or alternatively, when there is greater than or equal to the threshold quantity of bits in the information that identifies the reference signal configuration, BS 110 may use the short message (e.g., the PDCCH) to convey a bit indicator of a change to the reference signal configuration. In this case, UE 120 may communicate with BS 110 to reacquire the reference signal configuration using separate signaling as a response to receiving the bit indicator.

In some aspects, BS 110 may use a paging message to convey information identifying the reference signal configuration. For example, BS 110 may transmit a physical downlink shared channel (PDSCH) (e.g., scheduled by a PDCCH with a CRC scrambled by a P-RNTI of UE 120). In this case, BS 110 may transmit the PDSCH as a dedicated reference signal configuration identification message. Alternatively, BS 110 may transmit the PDSCH to convey other information (e.g., another paging message) and include information identifying the reference signal configuration along with the other information.

In some aspects, BS 110 may use RRC signaling to convey the information identifying the reference signal configuration when operating in a connected mode. For example, BS 110 may delay conveying the information identifying the reference signal configuration until UE 120 switches from an RRC connected mode to an RRC idle or RRC inactive mode. In this case, BS 110 may transmit an RRC release message that includes information identifying the reference signal configuration for UE 120 to use after completion of an RRC release or RRC suspension. Additionally, or alternatively, BS 110 may delay conveying information identifying the reference signal configuration until UE 120 switches to a connected mode (e.g., to perform a tracking area update, a radio access network based notification area update procedure, and/or the like). In this case, after UE 120 transitions to the connected mode, BS 110 may use connected mode UE RRC signaling to convey the information identifying the reference signal configuration.

In some aspects, BS 110 may apply one or more restrictions to the information identifying the reference signal configuration. For example, BS 110 and UE 120 may store information indicating that a subset of values for a parameter of the reference signal configuration are configurable. As an example, BS 110 and UE 120 may store information indicating that frequencies for CSI-RS resources are restricted to a subset of available frequencies, thereby reducing a payload to convey the information identifying the reference signal configuration by reducing a quantity of bits to signal which frequency is selected. Similarly, BS 110 may limit a periodicity for paging to a subset of values.

Additionally, or alternatively, BS 110 may define a functional relationship such that an indication of a first value for a first parameter implicitly indicates a second value for a second parameter, thereby reducing a signaling payload to an indication of the first value rather than the first value and the second value. As an example, BS 110 may define a scrambling sequence as a function of a cell identifier (and not of a radio network temporary identifier (RNTI) or another identifier), thereby reducing a payload for identifying the scrambling sequence to only an indication of the cell identifier. Similarly, BS 110 may define a relation between a bandwidth for a CSI-RS and an initial bandwidth part that UE 120 is to use when operating in an idle mode or inactive mode, thereby reducing signaling to identify the initial bandwidth part.

In some aspects, BS 110 and/or UE 120 may store a set of possible reference signal configurations to enable BS 110 to convey an identifier of a reference signal configuration. For example, BS 110 may transmit an identifier of a particular reference signal configuration (e.g., a bit indicator of a table entry), which may enable UE 120 to select the particular reference signal configuration from the set of possible reference signal configurations. Additionally, or alternatively, BS 110 may transmit information identifying a portion of a reference signal configuration to enable UE 120 to blind decode subsequent communications. For example, BS 110 may transmit information identifying a slot index, QCL information, an SSB index, and/or the like, which may enable UE 120 to perform blind decoding (e.g., using hypothesis testing) to communicate with BS 110. In this way, BS 110 avoids transmitting other information to UE 120 by utilizing UE 120's blind decoding techniques to infer the other information.

As further shown in FIG. 3, and by reference number 340, UE 120 may determine the reference signal configuration based at least in part on receiving the information identifying the reference signal configuration. For example, UE 120 may select the reference signal configuration from a set of possible reference signal configurations. Additionally, or alternatively, UE 120 may infer one or more parameters of the reference signal configuration from one or more signaled parameters. Additionally, or alternatively, UE 120 may perform one or more follow up procedures, such as a reference signal re-acquisition procedure (e.g., to re-acquire a CSI-RS or TRS configuration) based at least in part on receiving an indication that the reference signal configuration has changed. In this way, BS 110 and UE 120 enable utilization of reference signal resources assigned for a connected mode UE when UE 120 is operating in an inactive mode or an idle mode, thereby improving power utilization of UE 120.

As indicated above, FIG. 3 is provided as an example. Other examples may differ from what is described with respect to FIG. 3.

Figure 4:
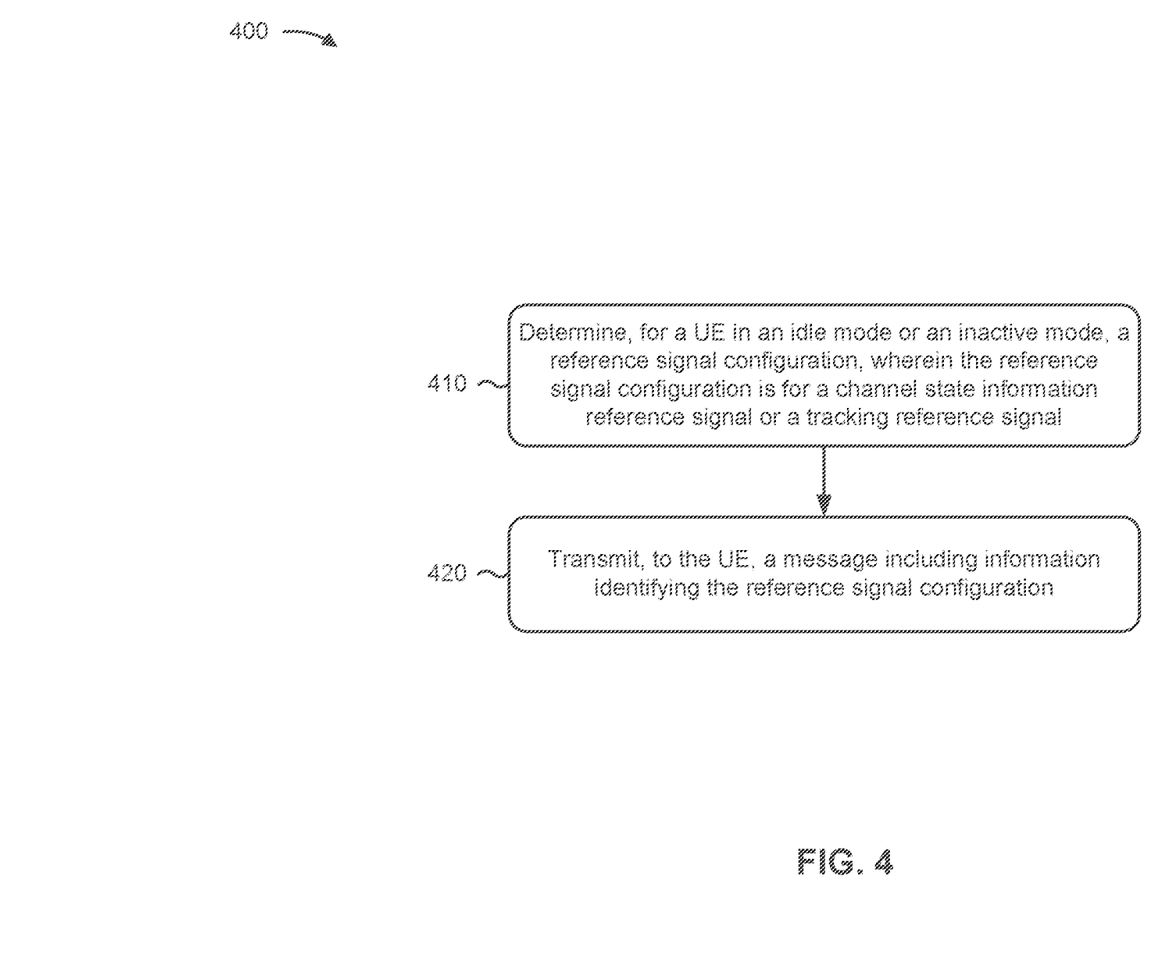
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where the BS (e.g., BS 110 and/or the like) performs operations associated with reference signal resource indication.

As shown in FIG. 4, in some aspects, process 400 may include determining, for a UE in an idle mode or an inactive mode, a reference signal configuration, wherein the reference signal configuration is for a channel state information reference signal or a tracking reference signal (block 410). For example, the BS (e.g., using transmit processor 220, receive processor 238, controller/processor 240, memory 242, and/or the like) may determine, for a UE in an idle mode or an inactive mode, a reference signal configuration, as described above. In some aspects, the reference signal configuration is for a channel state information reference signal or a tracking reference signal.

As further shown in FIG. 4, in some aspects, process 400 may include transmitting, to the UE, a message including information identifying the reference signal configuration (block 420). For example, the BS (e.g., using transmit processor 220, receive processor 238, controller/processor 240, memory 242, and/or the like) may transmit, to the UE, a message including information identifying the reference signal configuration, as described above.

Process 400 may include additional aspects, such as any single aspect or any combination of aspects described below and/or in connection with one or more other processes described elsewhere herein.

In a first aspect, the message is a system information block or a master information block.

In a second aspect, alone or in combination with the first aspect, the information identifying the reference signal configuration is included in a reserved bit field or a dedicated bit field of the message.

In a third aspect, alone or in combination with one or more of the first and second aspects, the message is a short message, associated with a physical downlink control channel, transmitted with a particular RNTI value.

In a fourth aspect, alone or in combination with one or more of the first through third aspects, the particular RNTI value is a paging RNTI value.

In a fifth aspect, alone or in combination with one or more of the first through fourth aspects, the short message includes an explicit indicator of the reference signal configuration or an indicator of a change to the reference signal configuration.

In a sixth aspect, alone or in combination with one or more of the first through fifth aspects, the message is a paging message.

In a seventh aspect, alone or in combination with one or more of the first through sixth aspects, the paging message is a physical downlink shared channel message scheduled by a physical downlink control channel message.

In an eighth aspect, alone or in combination with one or more of the first through seventh aspects, the paging message is a dedicated message for conveying the reference signal configuration.

In a ninth aspect, alone or in combination with one or more of the first through eighth aspects, the paging message includes other paging information in addition to the information identifying the reference signal configuration.

In a tenth aspect, alone or in combination with one or more of the first through ninth aspects, the message is a radio resource control message.

In an eleventh aspect, alone or in combination with one or more of the first through tenth aspects, the radio resource control message is a release message to trigger the UE to perform a radio resource control release or suspension procedure.

In a twelfth aspect, alone or in combination with one or more of the first through eleventh aspects, the radio resource control message is a tracking area update or radio access network based notification area update message.

In a thirteenth aspect, alone or in combination with one or more of the first through twelfth aspects, the reference signal configuration is limited to a subset of available parameters.

In a fourteenth aspect, alone or in combination with one or more of the first through thirteenth aspects, at least one value of the reference signal configuration is indicated implicitly based at least in part on a defined relationship with at least one other value.

In a fifteenth aspect, alone or in combination with one or more of the first through fourteenth aspects, the information identifying the reference signal configuration is an indicator of a selection of the reference signal configuration from a defined set of available reference signal configurations.

In a sixteenth aspect, alone or in combination with one or more of the first through fifteenth aspects, the information identifying the reference signal configuration explicitly identifies a first subset of parameters of the reference signal configuration, to enable blind decoding in connection with a second subset of parameters of the reference signal configuration that are not explicitly identified in the information identifying the reference signal configuration.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
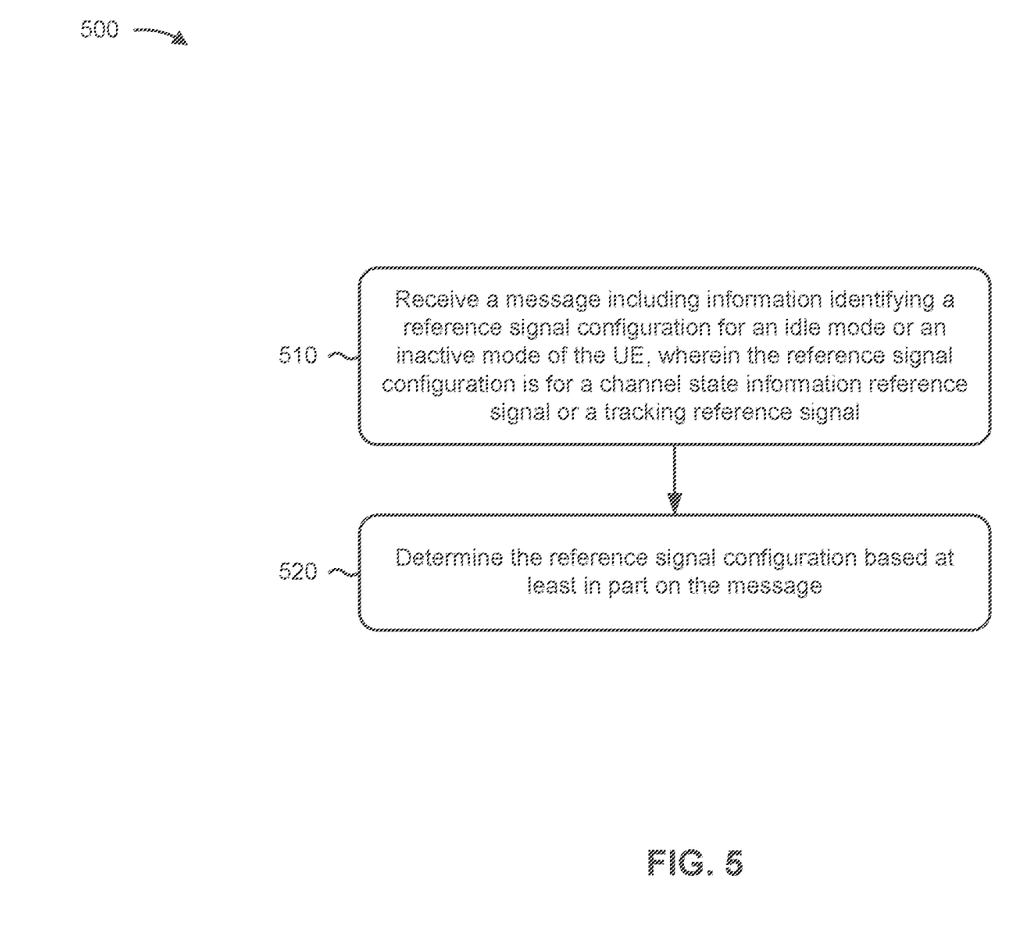
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with reference signal resource indication.

As shown in FIG. 5, in some aspects, process 500 may include receiving a message including information identifying a reference signal configuration for an idle mode or an inactive mode of the UE, wherein the reference signal configuration is for a channel state information reference signal or a tracking reference signal (block 510). For example, the UE (e.g., using antenna 252, DEMOD 254, MIMO detector 256, receive processor 258, controller/processor 280, and/or the like) may receive a message including information identifying a reference signal configuration for an idle mode or an inactive mode of the UE, as described above. In some aspects, the reference signal configuration is for a channel state information reference signal or a tracking reference signal.

As further shown in FIG. 5, in some aspects, process 500 may include determining the reference signal configuration based at least in part on the message (block 520). For example, the UE (e.g., using controller/processor 280 and/or the like) may determine the reference signal configuration based at least in part on the message, as described above.

Process 500 may include additional aspects, such as any single aspect or any combination of aspects described below and/or in connection with one or more other processes described elsewhere herein.

In a first aspect, the message is a system information block or a master information block.

In a second aspect, alone or in combination with the first aspect, the information identifying the reference signal configuration is included in a reserved field or a dedicated field of the message.

In a third aspect, alone or in combination with one or more of the first and second aspects, the message is a short message, associated with a physical downlink control channel, transmitted with a particular radio network temporary identifier (RNTI) value.

In a fourth aspect, alone or in combination with one or more of the first through third aspects, the particular RNTI value is a paging RNTI value.

In a fifth aspect, alone or in combination with one or more of the first through fourth aspects, the short message includes an explicit indicator of the reference signal configuration or an indicator of a change to the reference signal configuration.

In a sixth aspect, alone or in combination with one or more of the first through fifth aspects, the message is a paging message.

In a seventh aspect, alone or in combination with one or more of the first through sixth aspects, the paging message is a physical downlink shared channel message scheduled by a physical downlink control channel message.

In an eighth aspect, alone or in combination with one or more of the first through seventh aspects, the paging message is a dedicated message for conveying the reference signal configuration.

In a ninth aspect, alone or in combination with one or more of the first through eighth aspects, the paging message includes other paging information in addition to the information identifying the reference signal configuration.

In a tenth aspect, alone or in combination with one or more of the first through ninth aspects, the message is a radio resource control message.

In an eleventh aspect, alone or in combination with one or more of the first through tenth aspects, the radio resource control message is a release message.

In a twelfth aspect, alone or in combination with one or more of the first through eleventh aspects, process 500 includes performing a radio resource control release or suspension procedure based at least in part on receiving the release message.

In a thirteenth aspect, alone or in combination with one or more of the first through twelfth aspects, the radio resource control message is a tracking area update or radio access network based notification area update message.

In a fourteenth aspect, alone or in combination with one or more of the first through thirteenth aspects, the reference signal configuration is constrained to a subset of available parameters.

In a fifteenth aspect, alone or in combination with one or more of the first through fourteenth aspects, at least one value of the reference signal configuration is indicated implicitly based at least in part on a defined relationship with at least one other value.

In a sixteenth aspect, alone or in combination with one or more of the first through fifteenth aspects, the information identifying the reference signal configuration is an indicator of a selection of the reference signal configuration from a defined set of available reference signal configurations.

In a seventeenth aspect, alone or in combination with one or more of the first through sixteenth aspects, the information identifying the reference signal configuration explicitly identifies a subset of parameters of the reference signal configuration.

In an eighteenth aspect, alone or in combination with one or more of the first through seventeenth aspects, process 500 includes blind decoding a reference signal using the subset of parameters of the reference signal configuration.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
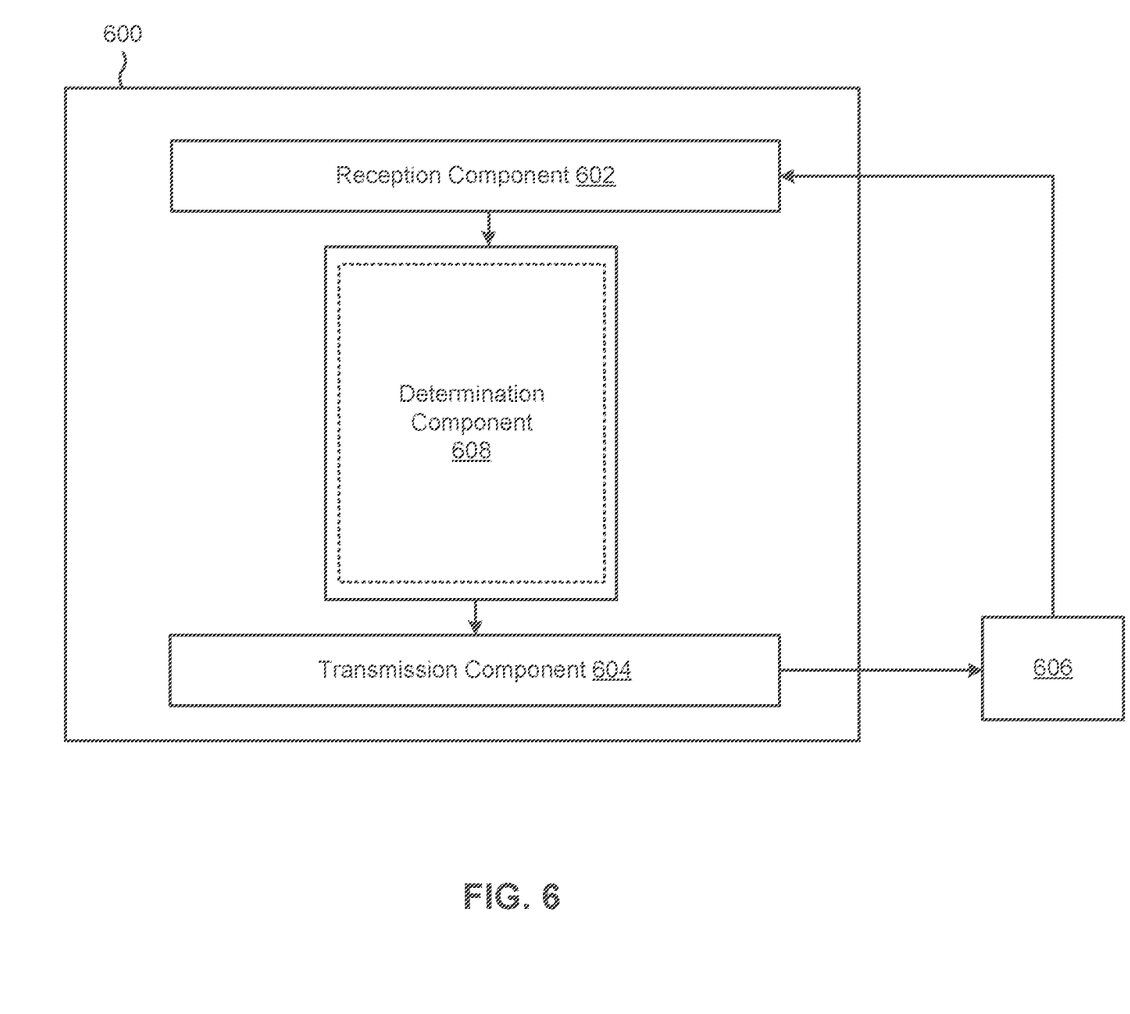
FIGS. 6 and 7 are diagrams illustrating example apparatuses, in accordance with various aspects of the present disclosure.

FIG. 6 is a block diagram of an example apparatus 600 for wireless communication. The apparatus 600 may be a BS, or a BS may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, among other examples. In some aspects, the apparatus 600 and/or one or more components shown in FIG. 6 may include one or more components of the BS described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the BS described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the BS described above in connection with FIG. 2. In some aspects, the transmission component 604 may be co-located with the reception component 602 in a transceiver.

The determination component 608 may determine, for a UE in an idle mode or an inactive mode, a reference signal configuration, wherein the reference signal configuration is for a channel state information reference signal or a tracking reference signal. The transmission component 604 may transmit, to the UE, a message including information identifying the reference signal configuration.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
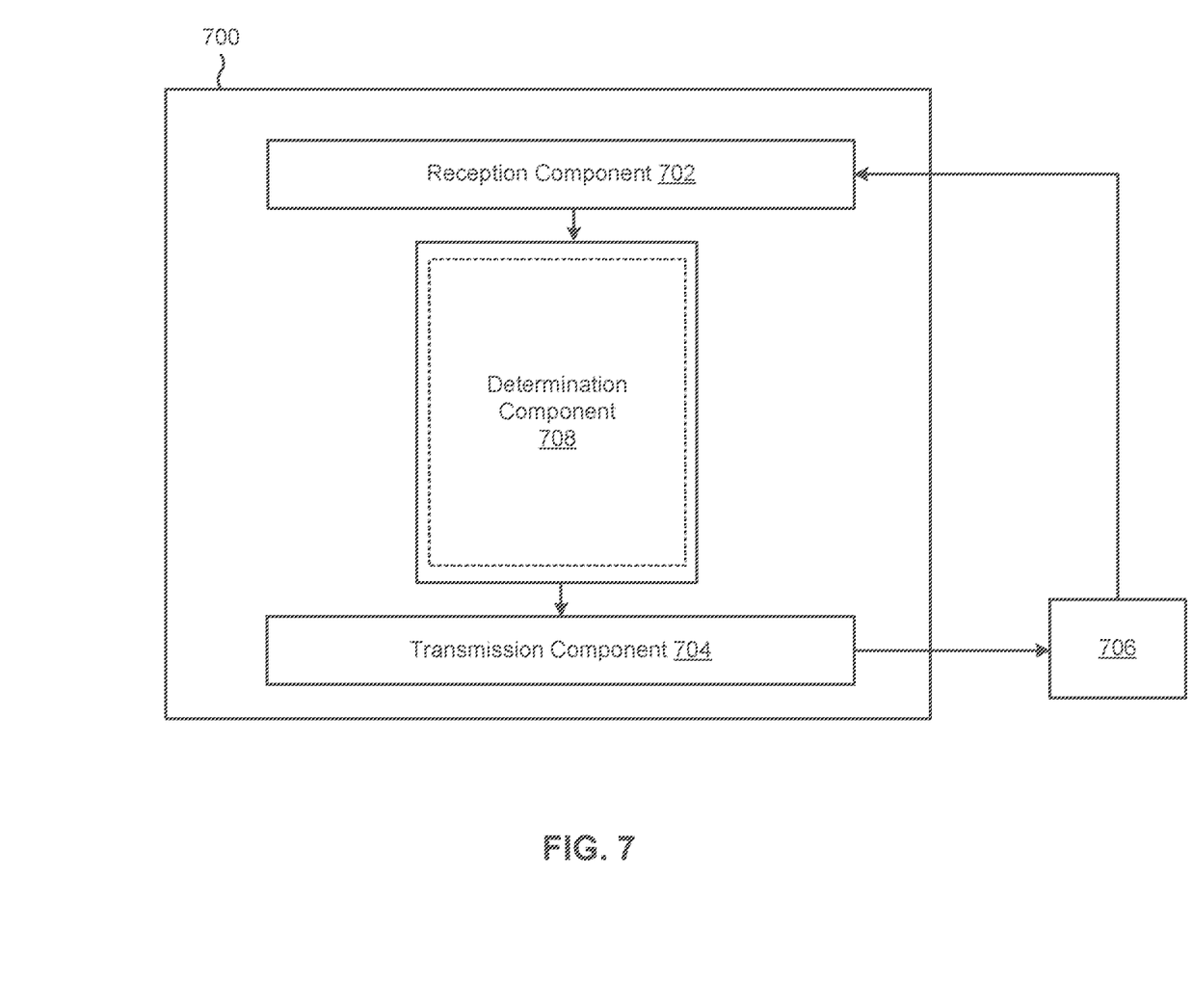

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, among other examples. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a message including information identifying a reference signal configuration for an idle mode or an inactive mode of the UE, wherein the reference signal configuration is for a channel state information reference signal or a tracking reference signal. The determination component 708 may determine the reference signal configuration based at least in part on the message.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    determining, for a user equipment (UE), a reference signal configuration, wherein the reference signal configuration indicates a tracking reference signal resource for use by the UE when the UE is in an idle mode or an inactive mode; and
    transmitting, to the UE, a message including information identifying the reference signal configuration to enable the UE to utilize the tracking reference signal resource when the UE is in the idle mode or the inactive mode.

2. The method of claim 1, wherein the message is a physical downlink control channel message transmitted with a particular radio network temporary identifier (RNTI) value.

3. The method of claim 2, wherein the particular RNTI value is a paging RNTI value.

4. The method of claim 3, wherein the physical downlink control channel message includes a cyclic redundancy check (CRC) scrambled by the paging RNTI.

5. The method of claim 2, wherein the physical downlink control channel message includes an explicit indicator of the reference signal configuration.

6. The method of claim 1, wherein the information identifying the reference signal configuration is included in a reserved bit field or a dedicated bit field of the message.

7. The method of claim 1, wherein the message is a dedicated message for conveying the reference signal configuration.

8. The method of claim 1, wherein a parameter of the reference signal configuration is associated with a set of values for the parameter.

9. A base station (BS) for wireless communication, comprising:
one or more memories; and
one or more processors, coupled to the one or more memories, configured to cause the BS to:
determine, for a user equipment (UE), a reference signal configuration, wherein the reference signal configuration indicates a tracking reference signal resource for use by the UE when the UE is in an idle mode or an inactive mode; and
transmit, to the UE, a message including information identifying the reference signal configuration to enable the UE to utilize the tracking reference signal resource when the UE is in the idle mode or the inactive mode.

10. The BS of claim 9, wherein the message is a physical downlink control channel message transmitted with a particular radio network temporary identifier (RNTI) value.

11. The BS of claim 10, wherein the particular RNTI value is a paging RNTI value.

12. The BS of claim 11, wherein the physical downlink control channel message includes a cyclic redundancy check (CRC) scrambled by the paging RNTI.

13. The BS of claim 10, wherein the physical downlink control channel message includes an explicit indicator of the reference signal configuration.

14. The BS of claim 9, wherein the information identifying the reference signal configuration is included in a reserved bit field or a dedicated bit field of the message.

15. The BS of claim 9, wherein the message is a dedicated message for conveying the reference signal configuration.

16. The BS of claim 9, wherein a parameter of the reference signal configuration is associated with a set of values for the parameter.

17. A non-transitory computer-readable medium storing a set of instructions for wireless communication, the set of instructions comprising:
one or more instructions that, when executed by one or more processors of a base station (BS), cause the BS to:
determine, for a user equipment (UE), a reference signal configuration, wherein the reference signal configuration indicates a tracking reference signal resource for use by the UE when the UE is in an idle mode or an inactive mode; and
transmit, to the UE, a message including information identifying the reference signal configuration to enable the UE to utilize the tracking reference signal resource when the UE is in the idle mode or the inactive mode.

18. The non-transitory computer-readable medium of claim 17, wherein the message is a physical downlink control channel message transmitted with a particular radio network temporary identifier (RNTI) value.

19. The non-transitory computer-readable medium of claim 18, wherein the particular RNTI value is a paging RNTI value.

20. The non-transitory computer-readable medium of claim 19, wherein the physical downlink control channel message includes a cyclic redundancy check (CRC) scrambled by the paging RNTI.

21. The non-transitory computer-readable medium of claim 18, wherein the physical downlink control channel message includes an explicit indicator of the reference signal configuration.

22. The non-transitory computer-readable medium of claim 17, wherein the information identifying the reference signal configuration is included in a reserved bit field or a dedicated bit field of the message.

23. The non-transitory computer-readable medium of claim 17, wherein the message is a dedicated message for conveying the reference signal configuration.

24. The non-transitory computer-readable medium of claim 17, wherein a parameter of the reference signal configuration is associated with a set of values for the parameter.

25. An apparatus for wireless communication, comprising:
means for determining, for a user equipment (UE), a reference signal configuration, wherein the reference signal configuration indicates a tracking reference signal resource for use by the UE when the UE is in an idle mode or an inactive mode; and
means for transmitting, to the UE, a message including information identifying the reference signal configuration to enable the UE to utilize the tracking reference signal resource when the UE is in the idle mode or the inactive mode.

26. The apparatus of claim 25, wherein the message is a physical downlink control channel message transmitted with a particular radio network temporary identifier (RNTI) value.

27. The apparatus of claim 26, wherein the particular RNTI value is a paging RNTI value.

28. The apparatus of claim 27, wherein the physical downlink control channel message includes a cyclic redundancy check (CRC) scrambled by the paging RNTI.

29. The apparatus of claim 26, wherein the physical downlink control channel message includes an explicit indicator of the reference signal configuration.

30. The apparatus of claim 25, wherein the information identifying the reference signal configuration is included in a reserved bit field or a dedicated bit field of the message.

* * * * *